US012757089B2

(12) United States Patent
Sharma et al.

(10) Patent No.: US 12,757,089 B2
(45) Date of Patent: Oct. 6, 2026

(54) SYSTEM AND METHOD TO IMPROVE CONNECTION RELIABILITY ON SMART METERS

(71) Applicant: Honeywell International Inc., Charlotte, NC (US)

(72) Inventors: Manish Sharma, Hyderabad (IN); Murali Krishna Bezawada, Hyderabad (IN); Nivedita Sri Lakshmi Ganeswari Adapa, Hyderabad (IN); Santosh Kumar Vuddagiri, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 297 days.

(21) Appl. No.: 18/440,916

(22) Filed: Feb. 13, 2024

(65) Prior Publication Data

US 2025/0261067 A1 Aug. 14, 2025

(51) Int. Cl.

| | |
|---|---|
| ***H04W 36/14*** | (2009.01) |
| ***H04W 36/30*** | (2009.01) |
| ***H04W 52/02*** | (2009.01) |
| ***H04W 88/06*** | (2009.01) |

(52) U.S. Cl.

CPC ........... *H04W 36/14* (2013.01); *H04W 36/30* (2013.01); *H04W 52/0212* (2013.01); *H04W 88/06* (2013.01)

(58) Field of Classification Search

CPC . H04W 36/14; H04W 36/30; H04W 52/0212; H04W 88/06; H04W 8/183; H04W 48/18; H04L 67/12; G06Q 50/06

See application file for complete search history.

(56) References Cited

U.S. PATENT DOCUMENTS

| | | | | |
|---|---|---|---|---|
| 8,880,092 | B1 * | 11/2014 | Cooley | H04W 64/00 455/115.2 |
| 9,036,547 | B2 * | 5/2015 | Diaz | H04L 45/306 370/328 |
| 10,015,665 | B2 * | 7/2018 | Chastain | G06F 21/79 |
| 10,375,629 | B2 * | 8/2019 | Zhang | H04W 8/18 |
| 10,645,576 | B1 * | 5/2020 | Deshmukh | H04L 63/065 |
| 10,701,551 | B1 * | 6/2020 | Obaidi | H04W 12/43 |
| 10,863,423 | B2 * | 12/2020 | Lee | H04L 65/1016 |
| 11,038,550 | B1 * | 6/2021 | Hanley | H04B 1/7143 |
| 11,265,681 | B1 * | 3/2022 | Lee | G01S 19/26 |

(Continued)

OTHER PUBLICATIONS

Extended European Search Report mailed May 20, 2025, issued in connection with corresponding EP Patent Application No. 25155258.4 (13 pages total).

*Primary Examiner* — Dominic E Rego

(74) *Attorney, Agent, or Firm* — John Maldjian, Esq.; Stevens & Lee PC

(57) ABSTRACT

An advanced metering infrastructure includes a smart meter system with at least one sensor, a communication device, and a battery supply. The smart meter system is provided with algorithms and configuration to improve wireless connection reliability on the smart meter by providing more than one mobile operator configuration and more than one modem stacks for respective mobile network operators. When a mobile connection becomes unavailable, the system may automatically or manually change a mobile network operator and/or modem stack in hopes that communication quality and connection availability improves.

20 Claims, 7 Drawing Sheets

(56) References Cited

U.S. PATENT DOCUMENTS 11,356,909 B1 * 6/2022 Lloyd H04W 88/16
11,368,849 B1 * 6/2022 Reeves H04W 12/67
11,790,349 B2 * 10/2023 Deshmukh H04L 67/12 705/66
12,108,327 B2 * 10/2024 Jiang H04W 52/028
12,137,377 B1 * 11/2024 Brodeur H04W 28/24
12,376,020 B2 * 7/2025 Hamilton H04W 64/006
12,387,263 B2 * 8/2025 Mullaney G06Q 40/04
2006/0173977 A1 * 8/2006 Ho H04L 67/125 709/220
2012/0029710 A1 * 2/2012 Dodderi H02J 13/1337 700/286
2012/0062390 A1 * 3/2012 Solomon H04Q 9/00 340/870.03
2013/0329639 A1 * 12/2013 Wietfeldt H04W 88/06 370/328
2014/0018111 A1 * 1/2014 Farley H04W 4/023 455/456.6
2014/0095245 A1 * 4/2014 Walsh G06Q 10/06315 705/7.25
2014/0106750 A1 * 4/2014 Roullier H04W 68/02 455/436
2015/0094968 A1 * 4/2015 Jia G05B 15/02 702/60
2015/0186809 A1 * 7/2015 Hawaldar G06Q 10/0631 705/7.12
2016/0204815 A1 * 7/2016 Su H04W 24/10 455/558
2017/0006135 A1 * 1/2017 Siebel G06F 8/10
2017/0048802 A1 * 2/2017 Bucknell H04W 40/005
2017/0094589 A1 * 3/2017 Bhasin H04W 48/18
2017/0289788 A1 10/2017 Lalwaney
2018/0006915 A1 * 1/2018 Kim H04L 43/0847
2018/0014239 A1 * 1/2018 Chau H04L 1/18
2018/0226795 A1 * 8/2018 Berger H02J 3/008
2019/0115985 A1 * 4/2019 Bechta G01S 7/021
2020/0089515 A1 * 3/2020 Hari G06N 3/02
2020/0329528 A1 * 10/2020 Rice H04B 1/0053
2020/0366667 A1 * 11/2020 Cebe H04L 9/302
2020/0396623 A1 * 12/2020 Kakinada H04L 41/0654
2021/0142411 A1 * 5/2021 Forbes, Jr. B60L 53/305
2021/0144717 A1 * 5/2021 Tsai H04W 8/24
2021/0293576 A1 * 9/2021 Schamber G06Q 10/0875
2021/0319894 A1 * 10/2021 Sobol G16H 50/30
2021/0329542 A1 * 10/2021 Singh H04W 48/16
2021/0392573 A1 * 12/2021 Staub H04W 12/06
2022/0004307 A1 * 1/2022 Simpson G01C 21/3807
2022/0240143 A1 * 7/2022 Hong H04W 36/0055
2022/0247560 A1 * 8/2022 Hansen H04L 9/0897
2022/0261026 A1 * 8/2022 Karlgaard H02J 3/381
2022/0322083 A1 * 10/2022 Kreishan H04W 12/0431
2023/0012793 A1 * 1/2023 Chak G06F 3/0481
2023/0104718 A1 * 4/2023 Bluestein H04W 48/18 455/435.2
2023/0123352 A1 * 4/2023 Hong H04B 17/318 370/329
2023/0209433 A1 * 6/2023 Tammana H04W 48/12 370/331
2023/0308855 A1 * 9/2023 Matolia H04W 8/183
2023/0344964 A1 * 10/2023 Liu H04W 36/00837
2023/0370530 A1 * 11/2023 Kalke H04L 67/55
2023/0396397 A1 * 12/2023 Srivastava H04W 8/183
2023/0396984 A1 * 12/2023 Shrivastava H04W 76/27
2024/0073765 A1 * 2/2024 Shrivastava H04W 36/0072
2024/0103289 A1 * 3/2024 Yoon G06F 1/263
2024/0276351 A1 * 8/2024 Mackenzie H04W 52/0206
2025/0039905 A1 * 1/2025 Huang H04L 5/0094
2025/0056457 A1 * 2/2025 Karabulut H04W 56/0045
2025/0114832 A1 * 4/2025 Martin H04W 4/38
2025/0133386 A1 * 4/2025 Patel H04W 8/18

* cited by examiner

SYSTEM AND METHOD TO IMPROVE CONNECTION RELIABILITY ON SMART METERS

FIELD

The present disclosure generally relates to improving connection reliability on smart meters by providing plural mobile operator configurations and plural modem stacks for respective mobile network operators.

BACKGROUND

Smart meters are continuing to gain popularity with service providers, including for example utility providers such as power, gas, water, and sewage service providers. These smart meters, which are often battery powered by virtue of their deployment in remote locations or in locations without reliable or accessible power supply, are deployed and expected to operate for extended periods of time. Often, the life cycle of these smart meters is expected to be 15 to 20 years. Accordingly, it is important to optimize battery consumption to ensure that the meters operate for their intended life cycle.

In order to provide accurate, reliable, and timely utility usage, many smart meters are capable of wireless communication to enable the meter to connect to the Head-End System (HES) of a utility provider, and the like, and are configured to send information to this HES. The HES system in turn may use this information, which may include consumption information, to generate billing and analytics data.

Wireless communication technologies change over time, and the connection between the meter and the HES may become obsolete or the environmental changes, such as cell tower location, obstructions introduced during the meter life cycle, interference introduced from new sources, and the like, may cause the connection between the meter and the HES to become unstable or unusable. This results in inaccurate, incomplete, or unavailable consumption data which causes loss for the utility provider. Accordingly, there exists a need for smart meters to be provided with a more robust and adaptable wireless communications system compatible the unique requirements of a battery-powered, long lifecycle energy consumption requirements.

SUMMARY

The aforementioned aspects and other objectives can now be achieved as described herein.

In an embodiment, a smart meter system (100) comprises: a utility meter configured to measure real-time distribution of a resource and generate metrology data indicating a quantity of the resource consumed; a wireless communication device configured to establish a connection with one or more mobile networks based on one or more subscriber identity modules (SIMs), the wireless communication device comprising a transceiver capable of sending and receiving information via the one or more mobile networks and further comprising one or more configuration profiles; wherein, in response to a first condition being met, the wireless communication device switches from a first configuration profile to a second configuration profile; and wherein, in response to a second condition being met, the wireless communication device switches from a first mobile network to a second mobile network.

In an embodiment, a system further comprises wherein the switching from a first mobile network to a second mobile network corresponds with switching from a first SIM to a second SIM.

In an embodiment, a system further comprises wherein when the communication device has switched to the second SIM, the communication device is configured to change the one or more configuration profiles based on the second SIM.

In an embodiment, a system further comprises wherein, in response to a third condition, the communication device switches from a second SIM to a third SIM.

In an embodiment, a system further comprises wherein the smart meter system is further configured to measure and record a connection quality indicator, and wherein the first condition is met when the connection quality indicator satisfies a first threshold and one or more unused configuration profiles exist.

In an embodiment, a system further comprises wherein the second condition is met when the connection quality indicator satisfies a first threshold and no unused configuration profiles exist.

In an embodiment, a system further comprises wherein the one or more configuration profiles correspond to a communication standard confirming to one or more of Cat-M, NB-IoT, LTE-M, LPWAN, 5G-MMTC, 5G-RedCap, eRedCap, and feRedCap.

In an embodiment, a system further comprises wherein power saving profile conforms to one or more of an extended discontinuous reception (eDRX) and power saving mode (PSM) standards.

In an embodiment, a system further comprises wherein when the wireless communication device (120) switches in response to the first condition or the second condition, the wireless communication device is configured to perform a reset and to establish a connection based on the second configuration profile or second mobile network, respectively.

In an embodiment, an advanced metering system, comprises: a plurality of smart meter systems, each smart meter system comprising: a utility meter configured to measure real-time distribution of a resource and generate metrology data indicating a quantity of the resource consumed; a wireless communication device configured to establish a connection with one or more mobile networks based on one or more subscriber identity modules (SIMs), the wireless communication device comprising a transceiver capable of sending and receiving information via the one or more mobile networks and further comprising one or more configuration profiles; wherein, in response to a first condition being met, the wireless communication device switches from a first configuration profile to a second configuration profile; and wherein, in response to a second condition being met, the wireless communication device switches from a first mobile network to a second mobile network; and a head-end system (HES) configured to communicate with the plurality of smart meters via the one or more mobile networks.

In an embodiment, a system further comprises wherein the HES is further configured to transmit one or more command signals to one or more of the plurality of smart meters.

In an embodiment, a system further comprises wherein the one or more command signals corresponds causes the communication device of one or more smart meters to switch from the first configuration profile to the second configuration profile.

In an embodiment, a system further comprises wherein the one or more command signals corresponds causes the communication device of one or more smart meters to switch from the first SIM to the second SIM.

In an embodiment, a system further comprises wherein the plurality of smart meters are configured to transmit the information to the HES via the connection.

In an embodiment, a method operating a smart meter comprises: measuring, using a utility meter and sensor of the smart meter, a distribution of a resource; generating, using a processor, metrology data indicating a quantity of the resource consumed; establishing, using a wireless communication device, a connection with a first mobile network based on a first subscriber identity module (SIM) and a first configuration profile; determining, using a processor and storage of the wireless communication device, if the connection with the first mobile network has become unreliable, wherein the connection is determined to be unreliable if a first threshold is satisfied; switching, in response to the first threshold being satisfied, from a first configuration profile to a second configuration profile corresponding to the first SIM.

In an embodiment, a method further comprises determining, using the processor and storage, if the connection with the first mobile network using the first configuration profile has become unreliable, wherein the connection is determined to be unreliable if the first threshold is satisfied; determining, using the processor and storage, if the number of configuration profiles attempted equals the total number of configuration profiles and all configuration profiles have been used; switching, in response to the determination that the total number of configuration profiles have been used, from a first mobile network to a second mobile network.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Figure 1:
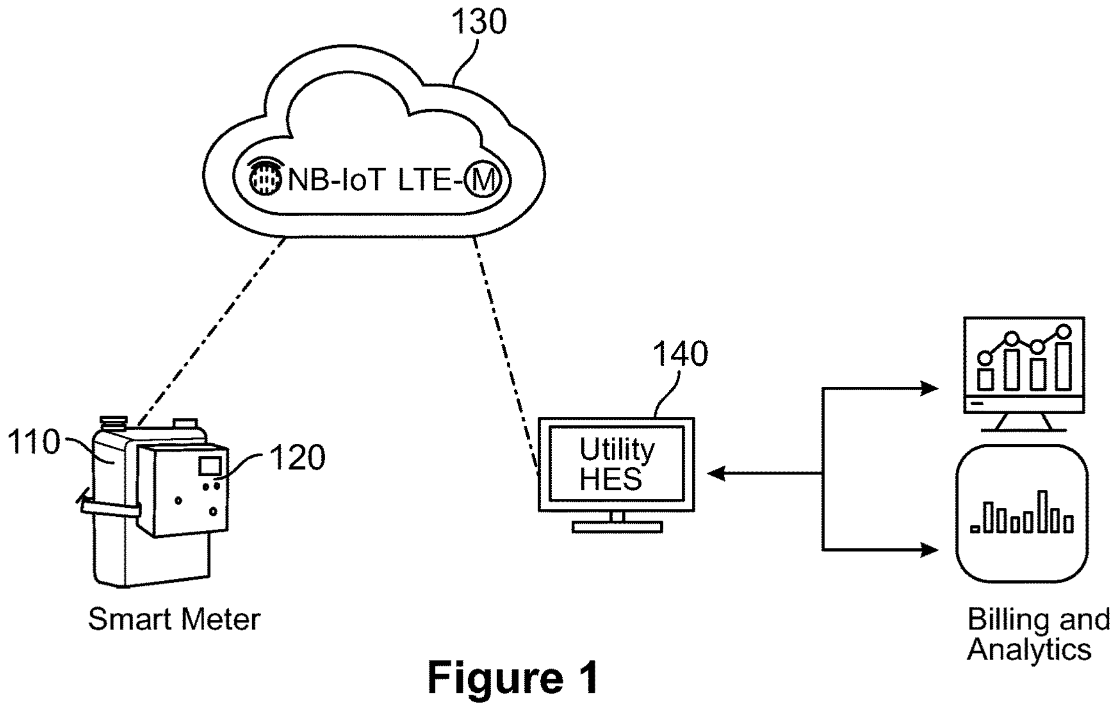
FIG. 1 illustrates an exemplary, high-level system overview for an advanced metering infrastructure (AMI) according to the present disclosure.

Unless otherwise indicated illustrations in the figures are not necessarily drawn to scale.

DETAILED DESCRIPTION

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc. v. H.J. Heinz Co.,* 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

INTRODUCTION

The present disclosure generally relates to smart meters for measuring consumption of a commodity, such as water, electricity, natural gas, and the like, and transmitting the consumption data to the provider, such as a utility company or administrative management entity. The transmission of consumption data may occur over one of a variety of mobile network operator systems (e.g., cellular network providers) and the wireless communications system coupled with the smart meter may be configured to operate on more than one mobile network and operate with more than one radio technology available on each mobile network. The present disclosure further details how the smart meter may switch between plural mobile network operators and/or switch between plural radio technologies (e.g., modem stacks) for respective mobile networks.

FIG. 1 illustrates an exemplary advanced metering infrastructure (AMI) system including a smart meter 110 equipped with a wireless communication device 120 as described herein. The wireless communication device 120, which may enable communication over cellular communications networks 130 using RF communication technologies conforming to 3G, 4G/LTE, 5G standards, and the like, allows for bi-directional exchange of data between the smart meter 110 and head-end system (HES) 140.

Smart meters such as those discussed in the present disclosure may be deployed in remote or urban areas, and subject to changing environmental conditions including dynamically changing wireless communication environments which affect signal quality or wireless network availability. Such meters are also battery powered and expected to operate for 15 to 20 years or more. It is therefore important to optimize the battery consumption of these meters. In general, the smart meter may be configured to operate in a "deep-sleep" or similar low power mode for the majority of the time in order to save the battery. Some examples of lower power modes may include extended discontinuous reception (eDRX) mode or power saving mode (PSM), which enable devices to enter predefined sleep periods of up to about 40 minutes (for LTE-M) or nearly 3 hours (for NB-IoT). After this period, the device may "wake up" after the time has elapsed to check if there is data waiting from the network. In some examples, this waking time may be around 1 millisecond (ms) if the meter doesn't need to send or receive data. Accordingly, the eDRX-enabled devices are very power efficient.

However, smart meters are intended to have life cycles of 15-20 years and the environment surrounding the smart meter may undergo significant changes in this time. For example, new building construction, new cell tower construction, removal of cell towers, changing wireless communications protocols, the introduction of new wireless communications systems near the smart meter, and other natural and man-made changes to the smart meter's environment, and the like, may all contribute to reduced connectivity between the smart meter and the wireless communications network(s). In some instances, the smart meter may become unable to communicate with the wireless network because of these changes. Since smart meters are expected to have life cycles spanning decades, and since it is not feasible to move the utility infrastructure in response to the changes, a system is needed which enables the smart meter to adapt to changing wireless communication environments in an efficient manner to maintain connectivity with the head-end system (HES).

Figure 2:
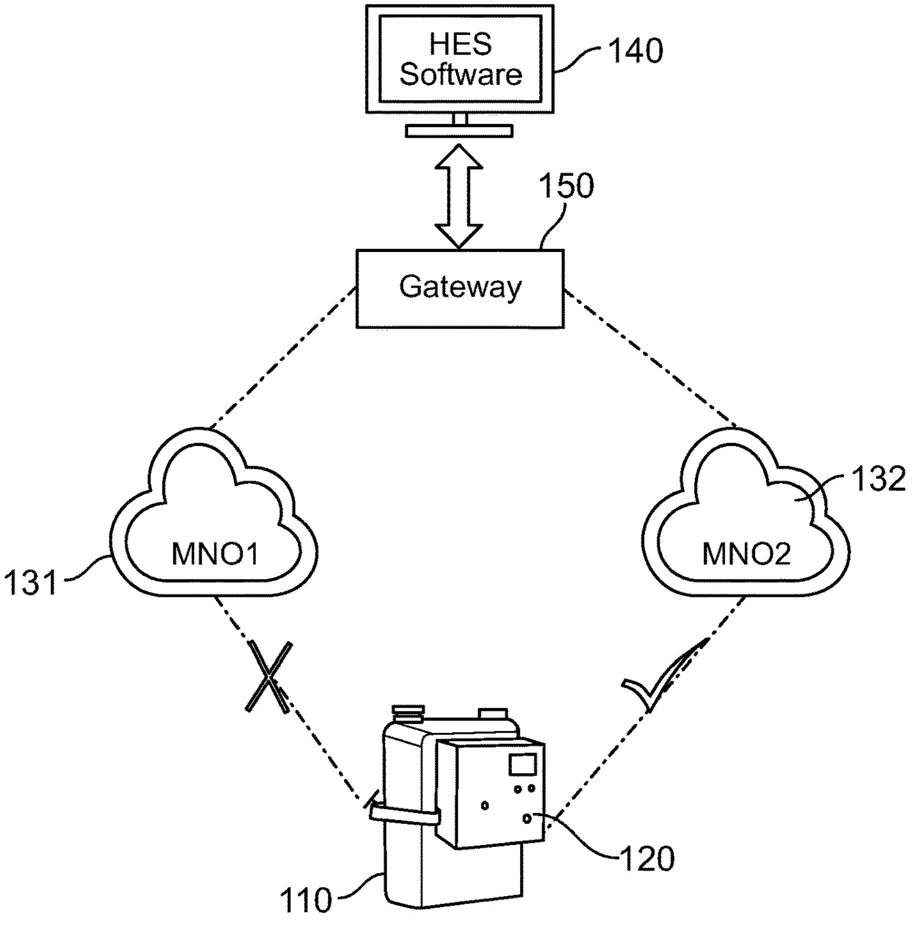
FIG. 2 illustrates a simplified overview of the mobile network operator (MNO) switching operation according to the present disclosure.

FIG. 2 illustrates a simplified overview of the mobile network operator (MNO) switching operation for cellular communication equipped smart meters 110 of the present disclosure. As will be discussed herein, in addition to having the ability to switch between various mobile network operators 131 and 132, the smart meter 110 and wireless communication device 120 may also enable switching between various RF communication technologies for respective MNOs. For example, in FIG. 2, when the wireless communication device 120 is unable to connect to a first MNO 131, the wireless communication device 120 may reconfigure itself to communicate with a second MNO 132. Both the first MNO 131 and second MNO 132 are capable of communicating with the gateway server 150 which inter-connects the MNO's and the with an enterprise's head-end system (HES) 140.

It is noted that although two mobile network operators 131, 132 are illustrated in FIG. 2, the present disclosure is not limited thereto and the wireless communication device 120 may be configurable to switch among three or more mobile network operators. Additionally, over-the-air processes such as remote SIM provisioning may enable the HES 140 to provide new or replace existing SIM profiles, and/or provide new or replace existing RF communication technologies, as needed to adjust which MNOs the wireless communication device 120 can communicate with.

Figure 3:
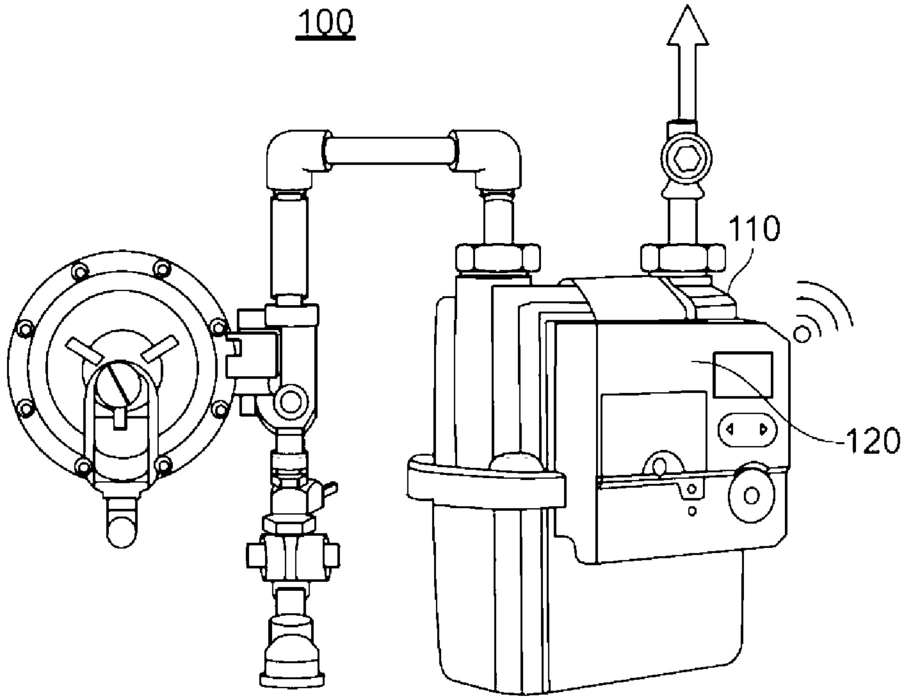
FIG. 3 illustrates a smart meter system according to the present disclosure.

FIG. 3 illustrates a system 100 with a smart meter 110. Connected to the smart meter 110 is a utility communication device 120. The communication device 120 attached to the smart meter 110, communicates with a gas utility system (e.g., a head-end system (HES) 140, see FIGS. 1 and 2) positioned at end points of the system 100. The HES 140 receives alerts in relation to the consumption data and status information from the smart meter 110 and can transmit command and control information the smart meter 110 and/or communication device 120 to change operation and configuration of the smart meter 110 and/or communication device 120. The communication device 120 can be provided inside the smart meter 110 in one or more embodiments. In other embodiments, the communication device 120 can be positioned on the smart meter 110. The communication device 120 can receive information on the smart meter 110 in relation to consumption data and status information via a physical connection (e.g, cable), and communicate that information to the gas utility system/HES. The communication device 120 also is configured to alert the gas utility system/HES of changes to consumption data and status information of the system 100 components.

Figure 4:
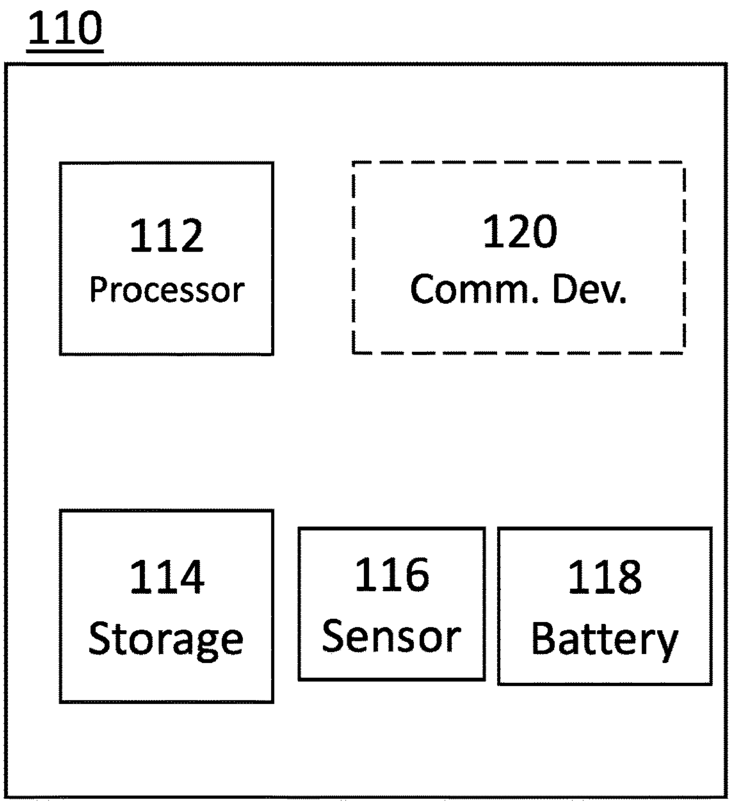
FIG. 4 illustrates block diagram of the smart meter system of FIG. 3.

FIG. 4 is a block diagram of the smart meter 110 of FIGS. 1-3. A smart meter 110 of the present disclosure may comprise a processor 112 for executing instructions stored in storage 114, which may include one or more of random-access memory (RAM), read-only memory (ROM), solid state device (SSD) storage, hard disc drive (HDD) storage, and the like. Storage 114 may contain algorithms and executable code for the processor 112 to execute in order to operate smart meter 110 components such as the sensor 116 and communication device 120. Storage 114 may also store sensor data and other analytical data the smart meter 110 collects. Storage 114 may further temporarily store data to be transmitted to or received from the communication device 120.

In some examples the sensor 116 may be a gas pressure or gas flow sensor that enables the processor 112 to monitor and record gas consumption or gas infrastructure conditions. In other examples the sensor 116 may be configured to measure and monitor electrical current, electrical voltage, water pressure, water flow, and the like, to enable measurement of consumption of electricity or water, respectively. The smart meter 110 may be configured with one or more sensors 116, and plural sensors 116 may be of different types.

Smart meter 110 may also be provided with a battery 118, such a non-rechargeable or rechargeable battery, to provide reliable power to the smart meter 110 and communication device 120. If communication device 120 is provided external to the smart meter 110, as illustrated in FIG. 3, then a power cable or similar connection (not shown) may be provided to the communication device 120. Battery 118 may be configured with enough energy storage to operate the smart meter 110 and communication device 120 for many years. In some examples the battery 118 is provided with enough stored energy to operate the smart meter 110 and communication device 120 for 1 years, 3 years, 5 years, 10 years, 15 years, 20 years, or longer. If battery 118 is a rechargeable battery, it may be recharged in various ways, such as via a photovoltaic cell (not shown) connected to the smart meter 120 or other renewable energy generator source (not shown).

As illustrated in FIG. 4 and discussed above, the smart meter 110 may also include a communication device 120, such as a wireless communication device, which enables the smart meter 110 to register with and communicate over wireless networks including, for example, a cellular or GSM-compliant mobile network 130 such as 2G, 3G, LTE, 5G, and the like (see FIG. 1). In some examples the communication device 120 may be included in the smart meter 110, such as provided on the same card, same board, or provided within the same enclosure as the other components of meter 110. In other examples, the communication device 120 may be provided external to the smart meter 110 but in electrical communication therewith. For example, communication device 120 may be attached to the smart meter 110 and connected with a cable (not shown) allowing for data transfer between the smart meter 110 and the communication device 120.

Figure 5:
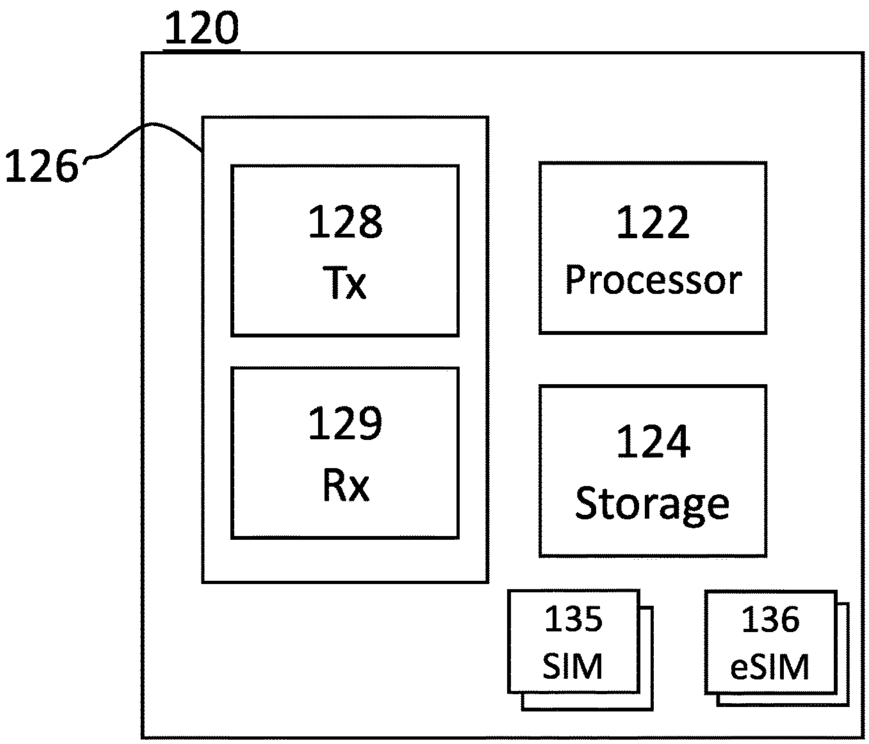
FIG. 5 illustrates block diagram of the communication device of FIG. 4.

FIG. 5 is a block diagram of the communication device 120 discussed above with respect to FIGS. 1-4. Communication device 120 may include a processor 122 for operating the communication device 120 based on algorithms and executable code stored in storage 124. Communication device 120 may also include mobile network operator (MNO) profiles, stored in storage 124, which correlate with one or more Subscriber Identity Modules (SIMs) 135 or one or more programmable embedded SIMs (eSIMs) 136. It is noted that although illustrated as having both physical, removable SIMs 135 and eSIMs 136, the wireless communication device 120 may have only physical SIMs 135 or eSIMs 136 without departing from the scope of the present disclosure. Similarly, storage 124 may also store various RF technology configurations for respective MNOs, such as modem stack configurations based on LTE-M, Cat-M. NB-IoT, low-power wide area network (LPWAN), mobile IoT, 5G-MMTC, 5G-RedCap. eRedCap, feRedCap and similar RF communication technologies which vary among mobile network operators. Processor 122 may be configured to program or reprogram eSIMs 136 based on the MNO profiles in storage 124, and MNO profiles may be selected, provided, or updated via over-the-air commands received via transceiver 126. That is, in some examples the MNO profiles, and their respective eSIM configurations, may be transmitted to the communication device 120 by a central control unit, such as a Head End System (HES) and the like.

Communication device storage 124 may include one or more of random-access memory (RAM), read-only memory (ROM), solid state device (SSD) storage, hard disc drive (HDD) storage, and the like. Storage 124 may also contain algorithms and executable code for the processor 122 to execute to control operation of the transceiver 126 and other communication device 120 operation (e.g., remote SIM provisioning (RSP). SIM and eSIM selection, power reset, power down, power mode change, and the like). A portion of storage 124 may operate as cache storage to retain performance records such as network (NW) registration status, reference signal received quality (RSRQ) or other connection quality metrics, call success rate, elapsed time since last successful communication, and the like. It is noted that although discussed herein as being stored in cache, performance records may be stored in other types of storage discussed above such as registers. RAM, ROM, SSDs, HDDs, and the like. Cache storage may be a dedicated portion of physical storage or may be stored as part of storage for logical operations used by the processor 112 and software executed by the processor 112. Communication device storage 124 may also temporarily store data transmitted or received via the transceiver 126, and also may store data for transmission to or received from smart meter 110. Data transmission between the smart meter 110 and communication device 120 may be exchanged via a via wired connection (e.g., a cable, optical interlink, ethernet, and the like) or wireless connection (e.g., NFC, Bluetooth (BT), BT low energy (BTLE), WiFi/IEEE 802.11, and the like). A wired connection (not shown) between communication device 120 and meter 110 may be provided via a combined cable connection for providing power from the battery 118 in the meter 110, or may be provided in a dedicated data transmission cable.

As illustrated in FIG. 5, in some examples the transceiver 126 may include a wireless transmitter module 128 and a wireless receiver module 129. The transmitter and receiver modules 128, 129 may be provided separately or integrated on a transceiver module.

Figure 6:
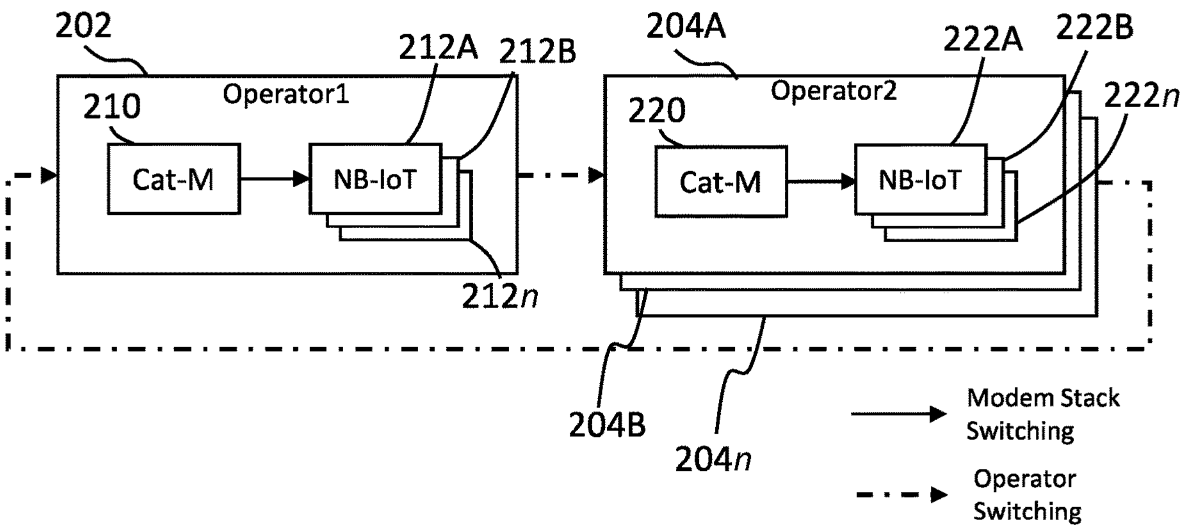
FIG. 6 illustrates an exemplary, high-level process flow of the mobile network operator and modem stack switching as presently disclosed.

FIG. 6 illustrates the general flow of the mobile network operator (MNO) profile switching and RF technology switching operations of the present disclosure. The smart meter 110 and communication device 120 as disclosed herein automatically switches between mobile network operator profiles, and automatically switches between RF technologies corresponding to those MNO profiles. By way of example, and without limitation, a general flow using two MNO profiles is illustrated. In a first configuration, the communication device 120, and therefore the smart meter 110, is configured to communicate with a head-end system (HES), or other reporting and control system, using a first MNO 202. While using first MNO 202, the communication device 120 may use a first modem stack 210, such as an RF technology confirming to the Cat-M standard, to transmit and receive data while requiring less power consumption compared with traditional mobile communication protocols.

If communication with first MNO 202 using modem stack 210 becomes inconsistent, unreliable, or unavailable, the communication device 120 may automatically, or manually in response to a command from HES or other control system, switch to another modem stack 212A, such as RF technology conforming to the Narrowband Internet of Things (NB-IoT) standard, and attempt registration with first MNO 202. If communication with first MNO 202 with modem stack 212A is unavailable or becomes inconsistent, unreliable, or unavailable, the communication device 120 may automatically, or manually, switch to another modem stack 212B, such as RF technology conforming to the Extended Coverage GSM Internet of Things (EC-GSM-IoT) standard, and again attempt registration with first MNO 202. If once again the registration with first MNO 202 becomes unreliable or unavailable, the communication device 120 may select an additional modem stack 212*n*, if available. It is noted that n represents any number of standardized modem stack configurations available and compatible with communications device 120.

If no additional modem stacks 212*n* are available for first MNO 202, then communications device 120 may automatically or manually switch to a second MNO 204A. The communications device will then progress through modem stacks 220, 222A, 222B, 222*n* as discussed above with respect to first MNO 202. If no additional modem stacks 222*n* are available for second MNO 204A, then communications device 120 may automatically or manually switch to a third MNO 204B and progress through modem stacks 220, 222A, 222B, 222*n* as discussed above with respect to first MNO 202 and second MNO 204A. If no additional modem stacks 222*n* are available for third MNO 204B, then communications device 120 may automatically or manually switch to an nth MNO 204*n* and progress through modem stacks 220, 222A, 222B, 222*n* as discussed above with respect to first MNO 202C, second MNO 204A, and third MNO 204B. If no additional MNOs are available, the communications device may power down or cycle back through first MNO 202 to repeat the process flow discussed above.

Accordingly, communications device 120 may utilize multiple MNO profiles 202, 204A-204*n* and corresponding modem stacks 210, 212A-212*n*, 220, 222A-222*n* for the MNO profiles to attempt to remain in contact with the head-end system or other central control and reporting system. If during the life cycle of the smart meter 110 the communications environment changes, due to cell tower construction, removal, new building construction, and the like, the smart meter 110 is configured to cycle through various mobile network operators and various modem stacks for the operators to regain and improve connectivity with the HES.

It is noted that Cat-M is an RF technology standard categorized under LTE-M (aka. LTE-MTC), and includes several subtypes such as LC-LTE, LC-MTCe, LTE-Cat 0, Cat-M1, Cat-M2. For simplicity, the present disclosure refers to these standards more broadly as Cat-M, but the disclosure is consistent the other subtypes of LTE-M. Similarly, NB-IoT and EC-GSM-IoT are discussed as other modem stack examples, but the present disclosure is not limited to these and a person of ordinary skill in the art would recognize that other IoT and low-power communications standards would be consistent with the presently disclosed smart meter system.

It is noted, however, that power-hungry communications standards such as WiFi, WiMAX, and the like, which are not optimized for power-efficient or low-power devices with long life cycles, such as the disclosed smart meter 110 system, would not be consistent with the present disclosure. The use of WiFi and other similar technologies for transfer and reception of data with the smart meter 110 system would not allow for the multi-year long life cycles necessary in advanced metering infrastructures such as those disclosed herein. Additionally, in addition to being power hungry, the range of WiFi-based communications protocols is significantly smaller than the communications range of mobile networks conforming to low-power 3GPP or GSM standards such as those discussed above. As such, the reduced range would not enable the construction and operation of effective, efficient advanced metering infrastructures such as those using the smart meter system disclosed herein.

Figure 7:
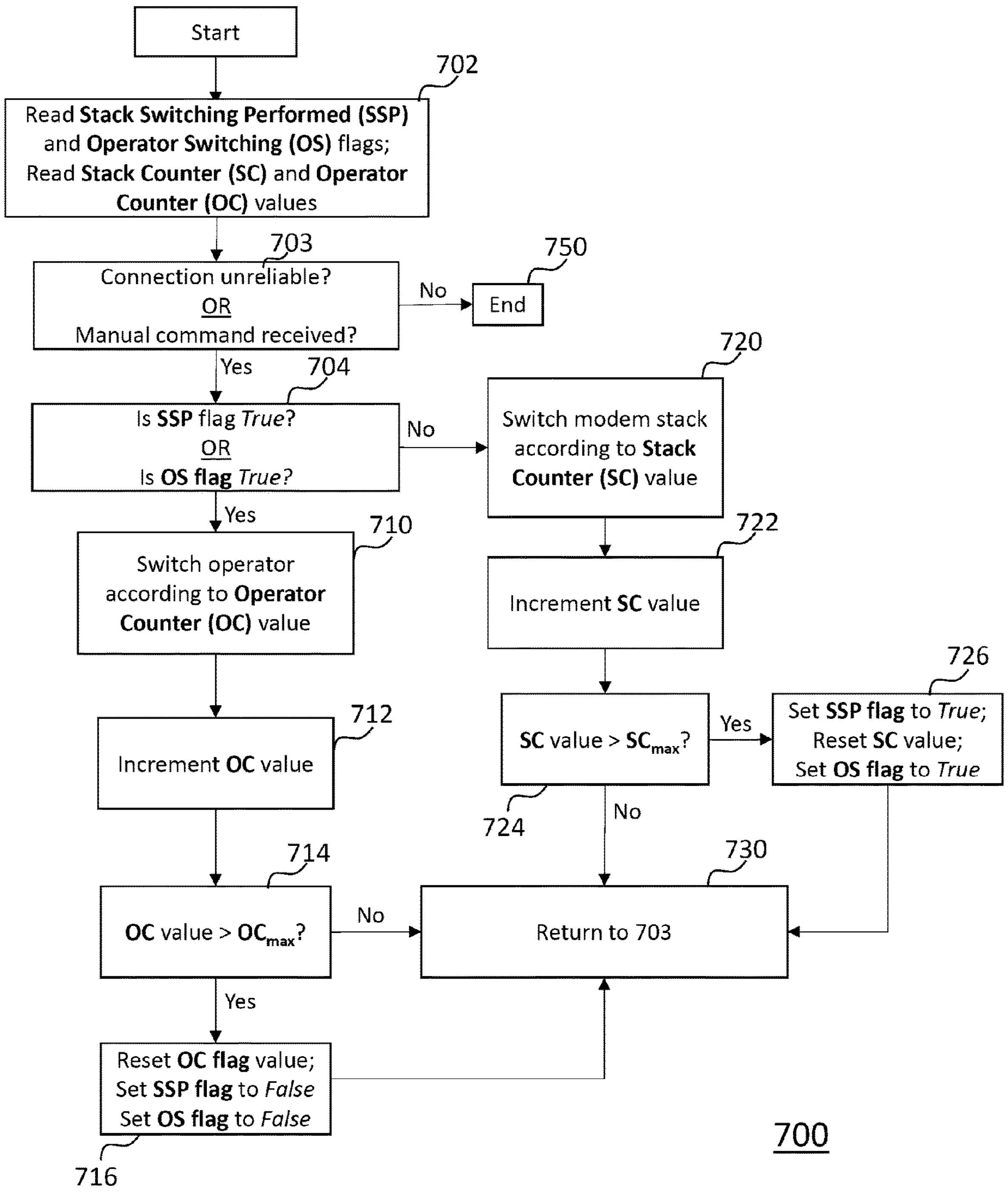
FIG. 7 illustrates an flow chart describing the process flow for switching mobile network operators and/or modem stacks.

FIG. 7 illustrates an exemplary flow chart 700 describing the process of switching operator profiles and/or modem stack RF technologies as discussed above. Upon initiation, at step 702 the system 100 reads from storage, (e.g., storage 114 or 124) a Stack Switching Performed (SSP) flag and Operator Switching (OS) flag. In step 702 a Stack Counter value and Operator Counter value is also read from storage. Stack Switching Performed SSP flag may in some examples be a True/False flag indicating if a modem stack switching operation has been performed and/or no additional modem stacks are available for the selected mobile network operator. Operator Switching (OS) flag may be a True/False flag indicating if switching of mobile network operators is desired.

Stack Counter (SC) may be a value representing a particular modem stack, with different modem stacks represented by different SC values. For example and without limitation, an SC value of 1 may indicate the use of a Cat-M modem stack. An SC value of 2 may indicate the use of an NB-IoT modem stack. Accordingly, a value $SC_{max}$, which may be 3, 4, 5, 10, or more, represents the total number of modem stacks available. When $SC_{max}$ is exceeded, then no additional modem stacks are available for that mobile network operator. Similarly, Operator Counter (OC) may be a value representing a particular mobile network operator (MNO), with different MNOs represented by different OC values. For example and without limitation, an OC value of 1 may indicate the use of a first mobile network operator (e.g., Verizon). An SC value of 2 may indicate the use of second mobile network operator (e.g., AT&T). Accordingly, a value $OC_{max}$, which may be 3, 4, 5, 10, or more, represents the total number of mobile network operators available. When $OC_{max}$ is exceeded, then no additional mobile networks are available for use by the system 100.

Returning to step 702, once the SSP flag, the OS flag, the SC value, and the OC value are read, the system proceeds to step 703. In step 703, the system determines if the connection is unreliable. Several factors can cause the connection to be deemed unreliable. In some examples, performance records such as network (NW) registration ability, reference signal received quality (RSRQ) or other connection quality metrics, call success rate, elapsed time since last successful communication, and the like, may indicate if a connection is unreliable. The term "unreliable" in step 703 is comprises several levels of low-quality connections including insufficient bandwidth connections, insufficient connection durations to allow data transfer, a low percentage of successful network registrations, and in extreme cases an unavailable connection indicated by repeated MNO registration failures. In one non-limiting example, if a network registration success rate is less than 40%, or an average RSRQ is less than-18 dB, or communication has been unavailable for a period of time such as two days, then the connection may be deemed unreliable and necessitate MNO and/or modem stack switching.

At step 703, if a connection is not deemed unreliable or a manual command from the HES has not been received (NO at step 703), then the MNO and modem stack switching system proceeds to step 750 and ends. Operation of system 100 and communication device 120 proceeds with the presently-configured, reliable MNO connection and modem stack. If at step 703 the connection is deemed unreliable OR a manual command has been received from the HES (YES at step 703), then the system proceeds to step 704 to begin MNO and/or modem stack switching.

In step 704, if the SSP flag is True or the OS flag is True, the system proceeds to step 710 to begin switching the mobile network operator (MNO) according to the Operator Count (OC) value. As discussed above, OC values may correspond to particular MNOs, and thus a different OC value represents the use of another MNO. The MNO may be switched by changing the communication device 120 to use a SIM card or eSIM profile corresponding to the MNO corresponding to the OC value. The system then proceeds to step 712 wherein the OC value is incremented. In some examples the OC value may be incremented by 1, so an OC value may for example change from 1 to 2, 2 to 3, 3 to 4, etc. At step 714 the system checks to see if the OC value incremented in step 712 is greater than $OC_{max}$, which represents the total number of MNOs available in the system. If the incremented OC value is greater than $OC_{max}$, then system proceeds to step 716 to reset the OC value to 1, set the SSP flag to False, and set the OS flag to False. If, in step 714, OC value is less than or equal to $OC_{max}$, then the system proceeds to step 730 which returns flow back to step 703.

Referring again to step 704, if neither the SSP flag nor the OS flag are True, then the system proceeds to step 720, wherein the system switches the modem stack according to the Stack Counter (SC) value.

As discussed above, SC values may correspond to particular modem stacks, and thus a different SC value represents the use of another modem stack. The modem stack may be switched by changing the communication device 120 to use different RF communication technology, which may differ slightly based on the MNO represented by an OC value since even with the same modem stack technology an MNO may have specific configurations. For example, an SC value of 1 may indicate using a Cat-M modem stack, while an SC value of 2 may indicate using an NB-IoT modem stack. Once the modem stack is switched in step 720, the system then proceeds to step 722 wherein the SC value is incremented. In some examples the SC value may be incremented by 1, so an SC value may for example change from 1 to 2, 2 to 3, 3 to 4, etc. At step 724 the system checks to see if the SC value incremented in step 722 is greater than $SC_{max}$, which represents the total number of modem stacks available in the system or available for the MNO corresponding to the OC value. If the incremented SC value is greater than $SC_{max}$, then system proceeds to step 726 to reset the SC value to 1, set the SSP flag to True, and set the OS flag to True. If, in step 724, SC value is less than or equal to $SC_{max}$, then the system proceeds to step 730 which returns flow back to step 703.

As discussed above with respect to FIG. 6, which a high-level process flow overview corresponding to the process flow chart 700, the modem stack and MNO switching operations may be performed automatically upon determination that a connection is unreliable (FIG. 7, step 703). However, if control center or head-end system (HES) would like the system 100 to switch MNOs or modem stacks manually, the HES can send a manual command to the system 100. For example, if the HES wants the system to change MNOs, the HES can send a manual command to change SSP flag to True and OS flag to True. Similarly, if an HES would like the system 100 to switch modem stacks manually, the HES can send a manual command to set OS flag to False and SSP flag to True. Based on this manual command, system flow will proceed as desired by the HES as illustrated in flow chart 700.

Figure 8:
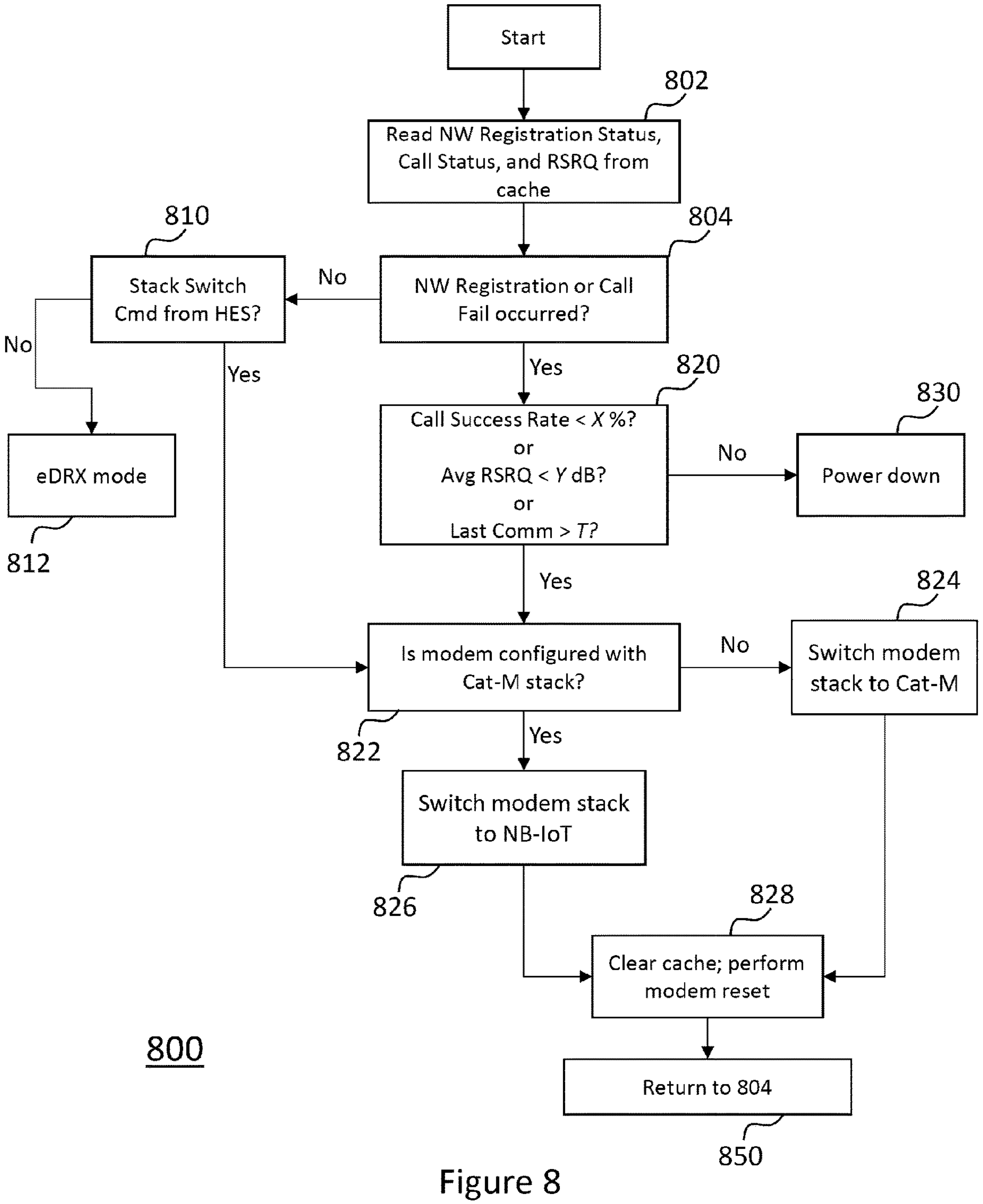
FIG. 8 illustrates a flow chart describing the process flow for switching modem stacks for an exemplary system with two modem stacks.

FIG. 8 illustrates a flowchart 800 describing a modem stack switching process flow for an exemplary system 100 configured with, for example, two modem stacks. After initiating, in step 802 the system reads network registration status, call status, and RSRQ from the cache. In step 804 the system determines if network registration or call failure has occurred. If network registration or call failure has not occurred (NO at step 804), then the system proceeds to step 810 to determine if a manual command to switch modem stacks has been received from the head-end system (HES) or other control center. If a manual command has not been received (NO in step 810), then the system proceeds to step 812 to operate in extended discontinuous reception (eDRX) mode.

Returning to step 804, if a network registration failure or call failure has occurred (YES at step 804), then the system proceeds to step 820 to determine if a network registration success rate percentage is below a threshold X %; if the average RSRQ is below a threshold Y decibels (dB); or if the elapsed time since the last successful communication is greater than a threshold T. In one non-limiting example, the threshold X is set to 40%, the threshold Y is set to −18 dB, and/or the threshold Tis set to 2 days (or equivalent hours, minutes, or seconds).

If in step 820 one of the thresholds is not satisfied (NO in step 820), the system may proceed to step 830 to power down the communication device 120 and wait for the next scheduled network registration attempt in order to reduce battery consumption when communications have been sufficiently unreliable or communication has been unavailable for an extended period of time. If in step 820 one of the thresholds X, Y, or T are met (YES at step 820), then the system proceeds to step 822.

In step 822, the system determines if the modem is configured with the Cat-M modem stack. If the modem is configured with the Cat-M modem stack, then the system proceeds to step 826 to switch the modem stack to NB-IoT. Once switched, the system proceeds to step 828 to clear NW Reg Stat, Call Status, and RSRQ cache. The modem is also reset so that the new modem stack can be initiated. Flow proceeds to step 850 with a return to step 804. It is also noted that, as discussed above, if a HES or other central control system administrator wants to manually switch the modem stack (YES in Step 810), the system will proceed to step 822 to proceed as above with switching modem stacks.

Returning to step 822, if the system determines that the modem is not configured with a Cat-M modem stack (NO in step 822), then the system proceeds to step 824 to switch modem stacks to Cat-M. Once the modem stack is switched in step 824, flow proceeds to step 828 to clear NW Reg Stat, Call Status, and RSRQ cache. The modem is also reset so that the new modem stack can be initiated. Flow proceeds to step 850 with a return to step 804.

Figure 9:
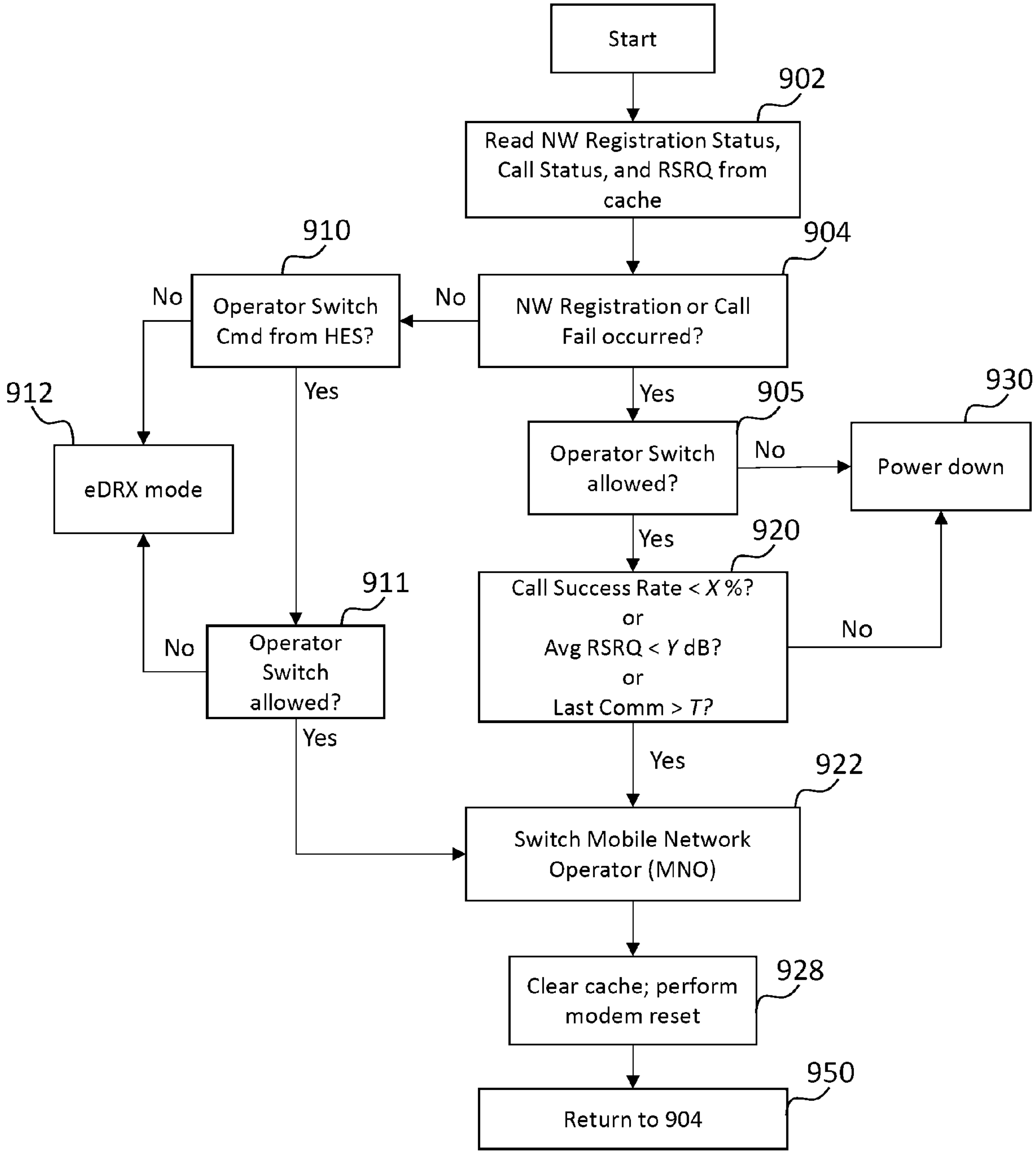
FIG. 9 illustrates a flow chart describing the process flow for switching mobile network operators for an exemplary system with two MNOs.

FIG. 9 illustrates a flowchart 900 detailing a mobile network operator (MNO or "operator") switching process exemplary system 100 configured with, for example, two MNOs. After initiating, in step 902 the system reads network registration status, call status, and RSRQ from the cache. In step 904 the system determines if network registration or call failure has occurred. If network registration or call failure has not occurred (NO at step 904), then the system proceeds to step 910 to determine if a manual command to switch Operators has been received from the head-end system (HES) or other control center. If a manual command has not been received (NO in step 810), then the system proceeds to step 912 to operate in extended discontinuous reception (eDRX) mode.

Returning to step 904, if a network registration of call failure has occurred (YES at step 904), then the system proceeds to step 905 to determine if the system is allowed to perform an Mobile Network Operator switch. If a MNO switch is not allowed (NO in step 905), the system proceeds to step 930 to power down the communication device 120 and wait for the next scheduled network registration attempt. For example and without limitation, an example of when an MNO switch is not allowed would be when a single SIM is provided, in which case only configuration profiles can be switched. If a MNO switch is allowed (YES in step 905), the system proceeds to step 920 to determine if a network registration success rate percentage is below a threshold X %; if the average RSRQ is below a threshold Y decibels (dB); or if the elapsed time since the last successful communication is greater than a threshold T. In one non-limiting example, the threshold X is set to 40%, the threshold Y is set to −18 dB, and/or the threshold Tis set to 2 days (or equivalent hours, minutes, or seconds).

If in step 920 one of the thresholds is not satisfied (NO in step 920), the system may proceed to step 930 to power down the communication device 120 and wait for the next scheduled network registration attempt in order to reduce battery consumption when communications have been sufficiently unreliable or communication has been unavailable for an extended period of time. If in step 920 one of the thresholds X, Y, or T are met (YES at step 920), then the system proceeds to step 922.

In step 922, the system proceeds with switching from a first MNO to a second MNO. As previously discussed, the system may include more than two MNOs and this example is provided with two MNOs to describe exemplary, non-limiting functionality. Once the MNO is switched, the system proceeds to step 928 to clear NW Reg Stat, Call Status, and RSRQ cache. The modem is also reset so that the new startup procedures for the new MNO can be initiated. Flow proceeds to step 950 with a return to step 904.

It is also noted that, as discussed above, if a HES or other central control system administrator wants to manually switch the modem stack (YES in Step 910), the system will proceed to step 911 to determine if an Operator switch is allowed. If an Operator switch is allowed (YES in step 911), then the system proceeds to step 922 to switch MNOs. If an operator switch is not allowed (NO in step 911), then the proceeds to step 912 to operate in extended discontinuous reception (eDRX) mode.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A smart meter system comprising:

a utility meter configured to measure real-time distribution of a resource and generate metrology data indicating a quantity of the resource consumed;

a wireless communication device configured to establish a connection with one or more mobile networks based on one or more subscriber identity modules (SIMs) or SIM with multiple mobile operator profile one or more programmable embedded SIMs (eSIMs), the wireless communication device comprising a transceiver capable of sending and receiving information via the one or more mobile networks and further comprising one or more radio access technology (RAT) configuration;

wherein, in response to a first condition being met, the wireless communication device switches from a first RAT configuration to a second RAT configuration; and wherein, in response to a second condition being met, the wireless communication device switches from a first mobile network operator to a second mobile network operator;

a processor, and storage, the storage storing one or more mobile network operator (MNO) profiles, one or more radio access technology (RAT) configurations for respective MNOs, a stack switching performed (SSP) flag, an operator switching (OS) flag, a stack counter (SC) value representing a selected one of a plurality of RAT configurations available for a currently selected mobile network operator, and an operator counter (OC) value representing a selected one of a plurality of mobile network operators, wherein the processor is configured to:

determine that a connection using the currently selected mobile network operator is unreliable, when the SSP flag and the OS flag are not true, switch from a first RAT configuration to a second RAT configuration according to the SC value for the currently selected mobile network operator, increment the SC value, and, when the incremented SC value is greater than a maximum number of RAT configurations available for the currently selected mobile network operator, reset the SC value to 1 and set the SSP flag and the OS flag to true; and wherein the processor is further configured, when the connection is unreliable and at least one of the SSP flag and the OS flag is true, switch from a first mobile network operator to a second mobile network operator by changing the wireless communication device to use a SIM card or eSIM profile corresponding to the second mobile network operator according to the OC value, increment the OC value, and, when the incremented OC value is greater than a maximum number of mobile network operators available, reset the OC value to 1 and set the SSP flag and the OS flag to false.

2. The system of claim 1, wherein the switching from a first mobile network operator to a second mobile network operator corresponds with switching from a first SIM to a second SIM.

3. The system of claim 2, wherein when the communication device has switched to the second SIM, the communication device is configured to change the one or more RAT configuration based on the second SIM.

4. The system of claim 3, wherein, in response to a third condition, the communication device switches from a second SIM to a third SIM.

5. The system of claim 1, wherein smart meter system the wireless communication device is further configured to measure and record a connection quality indicator, and wherein a first condition is met when the connection quality indicator satisfies a first threshold and one or more unused RAT configuration exist.

6. The system of claim 5, wherein the second condition is met when the connection quality indicator satisfies a first threshold and no unused RAT configuration exist when the connection quality indicator satisfies the first threshold and no additional RAT configurations remain available for the currently selected mobile network operator, the processor is configured to reset the SC value to 1, set the SSP flag and the OS flag to true, and switch from the first mobile network operator to the second mobile network operator according to the OC value.

7. The system of claim 5, wherein the first threshold is one or more of a call success rate, average reference signal received quality (RSRQ), a registration/attach time, and an elapsed time period of last successful call.

8. The system of claim 1, wherein the resource is one or more of natural gas, electricity, heat, or water and the metrology data is a measure of the quantity of the resource consumed at a first location over a first time interval.

9. The system of claim 1, wherein the one or more RAT configuration correspond to a communication standard confirming conforming to one or more of Cat-M, NB-IoT, LTE-M, LPWAN, 5G-MMTC, 5G-RedCap, eRedCap, and feRedCap.

10. The system of claim 9, wherein the one or more RAT configuration is configured according to the one or more SIMs used in establishing the connection.

11. The system of claim 1, wherein the smart meter system further comprises a battery and wherein the wireless communication device is configured to use a power saving profile corresponding to the one or more SIMs or the one or more RAT configuration.

12. The system of claim 11, wherein the power saving profile conforms to one or more of an extended discontinuous reception (eDRX) and power saving mode (PSM) standards.

13. The system of claim 1, wherein when the wireless communication device switches in response to the first condition or the second condition from the first RAT configuration to the second RAT configuration or from the first mobile network operator to the second mobile network operator, the wireless communication device is configured to perform a reset and to establish a connection based on the second RAT configuration or second mobile network operator, respectively.

14. An advanced metering system, comprising:

a plurality of smart meter systems, each smart meter system comprising:

a utility meter configured to measure real-time distribution of a resource and generate metrology data indicating a quantity of the resource consumed;

a wireless communication device configured to establish a connection with one or more mobile networks based on one or more subscriber identity modules (SIMs) or SIM with multiple mobile operator profile one or more programmable embedded SIMs (eSIMs), the wireless communication device comprising a transceiver capable of sending and receiving information via the one or more mobile networks; and further comprising one or more RAT configuration;

a processor, and storage, the storage storing one or more mobile network operator (MNO) profiles, one or more radio access technology (RAT) configurations for respective MNOs, a stack switching performed (SSP) flag, an operator switching (OS) flag, a stack counter (SC) value representing a selected one of a plurality of RAT configurations available for a currently selected mobile network operator, and an operator counter (OC) value representing a selected one of a plurality of mobile network operators;

wherein the processor is configured to:

determine that a connection using the currently selected mobile network operator is unreliable, when the SSP flag and the OS flag are not true, switch from a first RAT configuration to a second RAT configuration according to the SC value for the currently selected mobile network operator, increment the SC value, and, when the incremented SC value is greater than a maximum number of RAT configurations available for the currently selected mobile network operator, reset the SC value to 1 and set the SSP flag and the OS flag to true; and wherein the processor is further configured, when the connection is unreliable and at least one of the SSP flag and the OS flag is true, switch from a first mobile network operator to a second mobile network operator by changing the wireless communication device to use a SIM card or eSIM profile corresponding to the second mobile network operator according to the OC value, increment the OC value, and, when the incremented OC value is greater than a maximum number of mobile network operators available, reset the OC value to 1 and set the SSP flag and the OS flag to false wherein, in response to a first condition being met, the wireless communication device switches from a first RAT configuration to a second RAT configuration;

wherein, in response to a second condition being met, the wireless communication device switches from a first mobile network operator to a second mobile network operator; and a head-end system (HES) configured to communicate with the plurality of smart meters via the one or more mobile networks.

15. The system of claim 14, wherein the HES is further configured to transmit one or more command signals to one or more of the plurality of smart meters.

16. The system of claim 15, wherein the one or more command signals corresponds causes correspond to commands that cause the communication device of one or more smart meters to switch from the first RAT configuration to the second RAT configuration.

17. The system of claim 15, wherein the one or more command signals corresponds causes correspond to commands that cause the communication device of one or more smart meters to switch from a first SIM to a second SIM or one mobile operator profile to another mobile operator profile from a first eSIM profile to a second eSIM profile.

18. The system of claim 15, wherein the plurality of smart meters are configured to transmit the information to the HES via the connection.

19. A method operating a smart meter, the method comprising:

measuring, using a utility meter and sensor of the smart meter, a distribution of a resource;

generating, using a processor, metrology data indicating a quantity of the resource consumed;

establishing, using a wireless communication device, a connection with a first mobile network based on a first subscriber identity module (SIM) and a first RAT configuration;

determining, using a processor and storage of the wireless communication device, if the connection with the first mobile network has become unreliable, wherein the connection is determined to be unreliable if a first threshold is satisfied;

switching, in response to the first threshold being satisfied, from a first RAT configuration to a second RAT configuration corresponding to the first SIM reading, from the storage, a stack switching performed (SSP) flag, an operator switching (OS) flag, a stack counter (SC) value, and an operator counter (OC) value, the SC value representing a selected one of a plurality of RAT configurations available for a currently selected mobile network operator, and the OC value representing a selected one of a plurality of mobile network operators;

when the connection is unreliable and the SSP flag and the OS flag are not true, switching from the first RAT configuration to a second RAT configuration according to the SC value for the currently selected mobile network operator;

incrementing the SC value;

when the incremented SC value is greater than a maximum number of RAT configurations available for the currently selected mobile network operator, resetting the SC value to 1 and setting the SSP flag and the OS flag to true;

when the connection is unreliable and at least one of the SSP flag and the OS flag is true, switching from a first mobile network operator to a second mobile network operator by changing the wireless communication device to use a SIM card or eSIM profile corresponding to the second mobile network operator according to the OC value;

incrementing the OC value; and, when the incremented OC value is greater than a maximum number of mobile network operators available, resetting the OC value to 1 and setting the SSP flag and the OS flag to false.

20. The method of claim 19, further comprising:

determining, using the processor and storage, if the connection with the first mobile network using the first RAT configuration has become unreliable, wherein the connection is determined to be unreliable if the first threshold is satisfied;

determining, using the processor and storage, if the number of configuration profiles attempted equals the total number of RAT configuration and all RAT configuration have been used; and switching, in response to the determination that the total number of RAT configuration have been used, from a first mobile network operator to a second mobile network operator after switching from the first RAT configuration to the second RAT configuration or after switching from the first mobile network operator to the second mobile network operator, clearing stored network registration status, call status, and reference signal received quality (RSRQ) information and resetting a modem so that startup procedures for the second RAT configuration or the second mobile network operator are initiated.

* * * * *